US008307108B2

United States Patent
Chen et al.

(10) Patent No.: US 8,307,108 B2
(45) Date of Patent: Nov. 6, 2012

(54) MULTIMEDIA DATA STREAMING SYSTEM AND METHOD THEREOF

(75) Inventors: Shu-Fan Chen, Taipei (TW); Yu-Lin Chang, Taipei (TW)

(73) Assignee: Ubitus Technology Limited, Taipei (TW)

( * ) Notice: Subject to any disclaimer, the term of this patent is extended or adjusted under 35 U.S.C. 154(b) by 263 days.

(21) Appl. No.: 12/252,497

(22) Filed: Oct. 16, 2008

(65) Prior Publication Data

US 2010/0017439 A1    Jan. 21, 2010

(30) Foreign Application Priority Data

Jul. 18, 2008    (TW) .............................. 97127513 A

(51) Int. Cl.
G06F 15/16    (2006.01)
H04N 7/173    (2011.01)

(52) U.S. Cl. .......... 709/231; 709/232; 709/233; 725/95; 725/96

(58) Field of Classification Search .................. 709/231; 725/86–104
See application file for complete search history.

(56) References Cited

U.S. PATENT DOCUMENTS

| | | | |
|---|---|---|---|
| 2007/0067480 A1* | 3/2007 | Beek et al. ..................... | 709/231 |
| 2007/0083617 A1* | 4/2007 | Chakrabarti et al. ......... | 709/218 |
| 2008/0195698 A1* | 8/2008 | Stefanovic et al. ........... | 709/203 |
| 2009/0138540 A1* | 5/2009 | Peng et al. ..................... | 709/201 |
| 2009/0219992 A1* | 9/2009 | Wang ....................... | 375/240.03 |

* cited by examiner

*Primary Examiner* — Shirley Zhang
(74) *Attorney, Agent, or Firm* — Alan Kamrath; Kamrath IP Lawfirm, PA

(57) ABSTRACT

A multimedia data streaming system and a method thereof transmit multimedia data to a receiver by a streaming server through a dynamic streaming process. The multimedia data streaming system includes a converting module and a scheduler module. The scheduler module is used to obtain the bandwidth condition between the streaming server and the receiver dynamically. The scheduler module can request the converting module to convert the original data into streaming pieces with the optimal bit rates in accordance with the bandwidth condition detected. The streaming pieces can be transmitted to the receiver by the streaming server.

13 Claims, 3 Drawing Sheets

MULTIMEDIA DATA STREAMING SYSTEM AND METHOD THEREOF

BACKGROUND OF THE INVENTION

1. Field of the Invention

The present invention relates to a multimedia data streaming system and a method thereof and, more particularly, to a multimedia data streaming system and a method thereof which are able to detect the bandwidth condition dynamically and generate different bit rates of multimedia data according to the bandwidth detected. The multimedia data can then be transmitted to the receiver through a streaming process.

2. Description of the Related Art

With the advancement of technology, there are many electronic devices which can be used for web browsing, watching multimedia files or text files. Some examples of these devices are computers, PDAs and mobiles phones. Through the transmission ability of the internet, these multimedia or text files can be easily transmitted from one electronic device to another.

Due to the limitation of the network bandwidth or the lack of memory space at the receiver, large multimedia files often cannot be fully downloaded instantly and be played smoothly. Therefore, data streaming technology is developed to solve the above mentioned obstacles. However, data streaming technology is easily affected by the variation of network bandwidth; delayed jitter within the transmission; packet loss; and insufficient network bandwidth. Thus, the quality of transmission is unstable. As a result, the bit rate of the streaming pieces set initially cannot be transmitted successfully. Taking a video file as an example, there will be incoherence in the image and the sound (in most cases, there will be sound without image), and, in some incidents, the video will even crash half way while still playing the file.

Therefore, a multimedia data streaming system and a method thereof are needed to resolve the above mentioned problems.

SUMMARY OF THE INVENTION

The objective of the present invention is to provide a multimedia data streaming system and a method thereof able to detect the bandwidth condition dynamically and generate different bit rates of multimedia data according to the bandwidth detected. The multimedia data then can be transmitted to the receiver through a streaming process.

In order to achieve the above objective, the present invention presents a multimedia data streaming system which includes a converting module and a scheduler module. The scheduler module is used to dynamically obtain the bandwidth condition between the streaming server and the receiver. The scheduler module can then request the converting module to convert the original data into streaming pieces with the optimal bit rates in accordance with the bandwidth condition detected. The streaming pieces can then be transmitted to the receiver by the streaming server.

Through the above mentioned process, streaming pieces of different bit rates can be generated dynamically in accordance with the bandwidth condition detected and the streaming pieces will be transmitted to the receiver. Therefore, optimal streaming quality can be obtained under variable bandwidths.

In order to achieve the above objective, the multimedia data streaming method comprises the following steps: Step A: obtaining the bandwidth condition at the receiver dynamically; Step B: obtaining a streaming pieces which has a bit rate substantially close to the bandwidth detected, and the streaming piece is then transmitted to the receiver; and Step C: repeat Step A and Step B.

Through the above mentioned process, streaming pieces of different bit rates can be generated dynamically in accordance with the bandwidth condition detected, and the streaming pieces will be transmitted to the receiver.

DETAILED DESCRIPTION OF THE PREFERRED EMBODIMENT

The advantages and innovative features of the invention will become more apparent from the following preferred embodiments.

Figure 1:
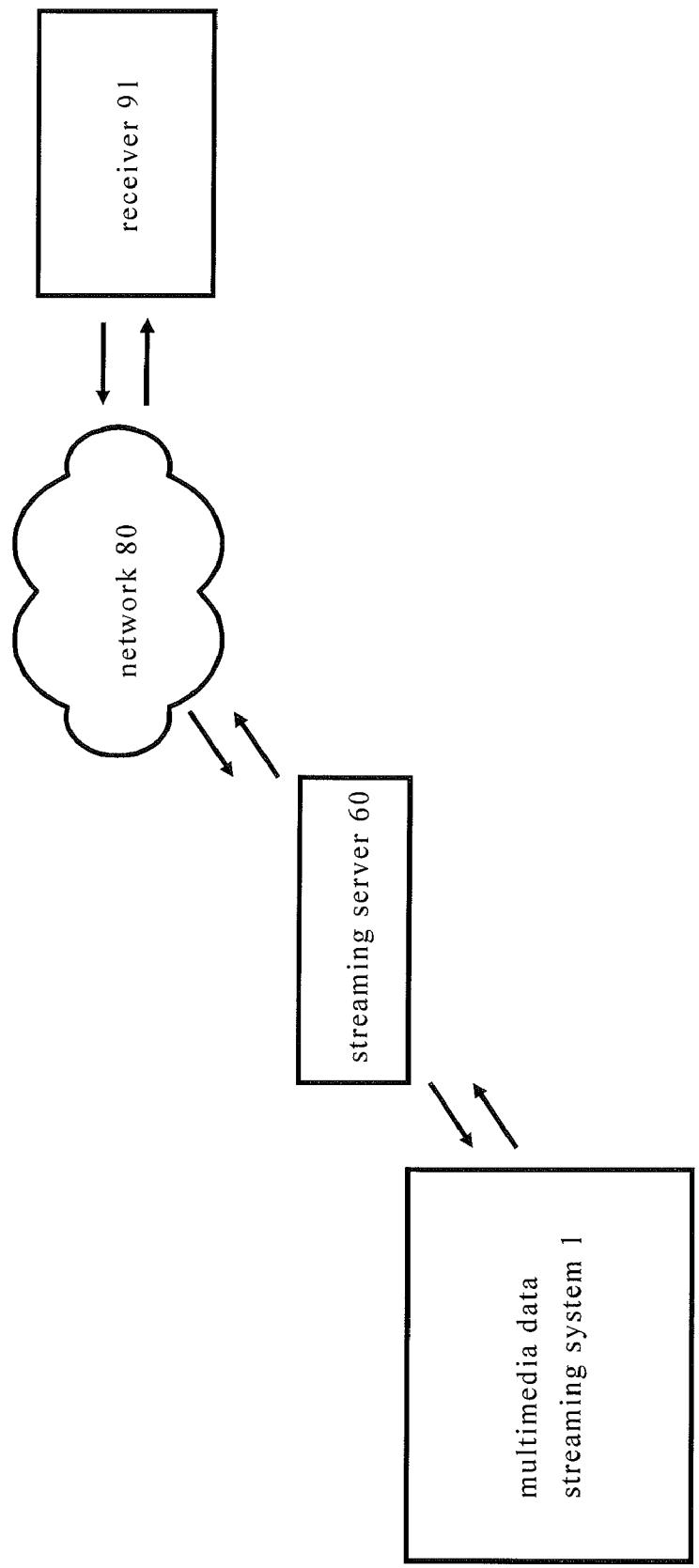
FIG. 1 shows the environment in which the multimedia data streaming system of the present invention is used.
Figure 2:
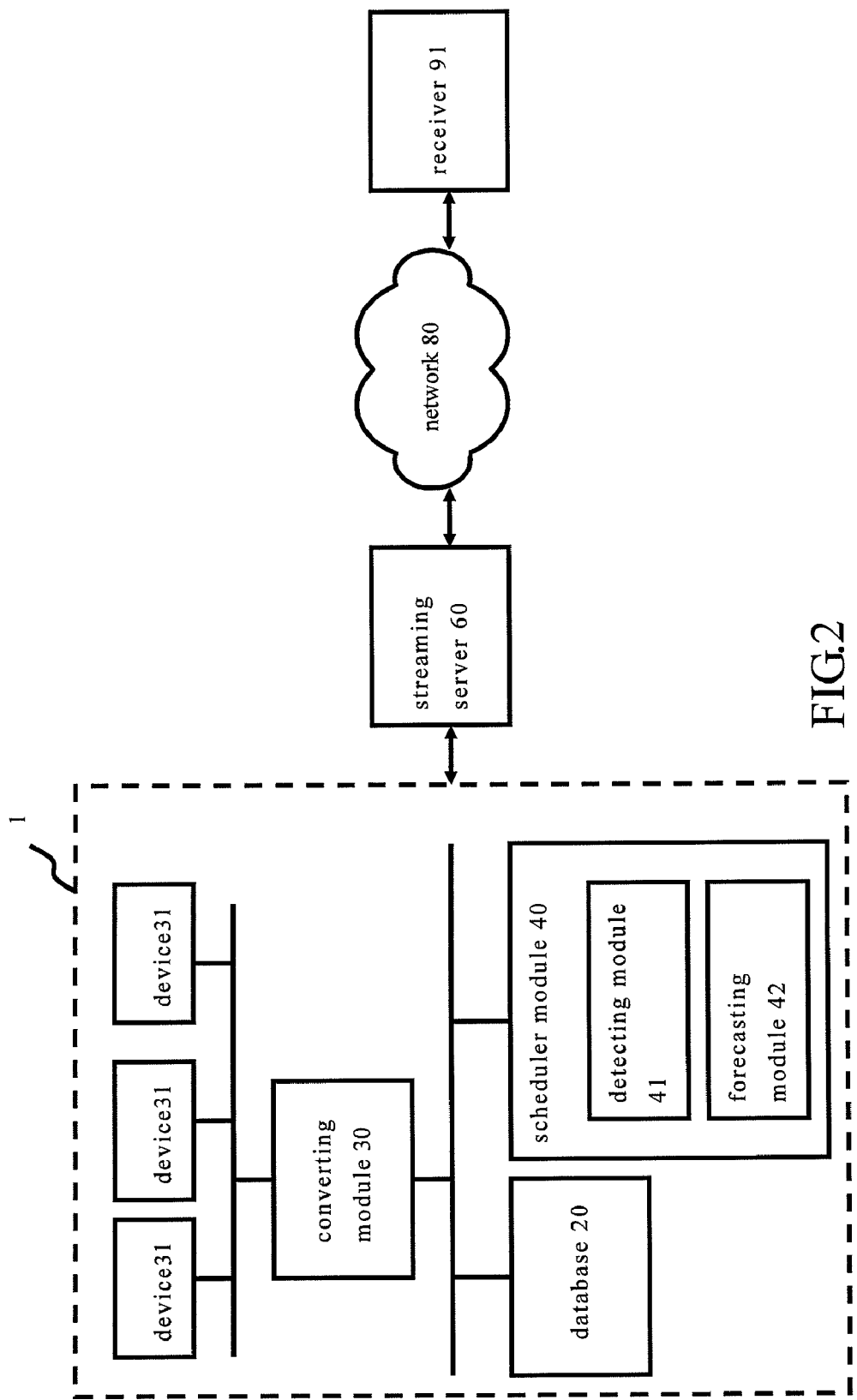
FIG. 2 shows the functional diagram of the multimedia data streaming system of the present invention.

FIG. 1 and FIG. 2 show an embodiment for the multimedia data streaming system of the present invention.

FIG. 1 shows the environment in which the multimedia data streaming system of the present invention is used. As shown in FIG. 1, a multimedia data streaming system 1 is connected to a receiver 91 through a streaming server 60 and a network 80. When the streaming sever 60 receives a multimedia data streaming request from the receiver 91, the multimedia data streaming system 1 will connect to the network 80 and transmit the multimedia data to the receiver 91. The protocols used for the transmission among the multimedia data streaming system 1, the network 80 and the receiver 91 include: Resource Reservation Setup Protocol (RSVP); Realtime Transport Protocol (RTP); RTP Control Protocol (RTCP); Real Time Streaming Protocol (RTSP); Real Time Messaging Protocol (RTMP); User Data Protocol (UDP); or Internet Protocol (IP). However, the present invention is not limited to these protocols. The above mentioned protocols are known in the art and are not the focus of the present invention. Thus, these protocols will not be discussed in further detail.

In one embodiment of the present invention, the multimedia data which is transmitted by the multimedia data streaming system 1 includes video data (e.g. 3GP, FLV or MOV), sound data (e.g. MP3 or WAV), image data (e.g. JPG, BMP or GIF), text data (TXT), or a combination of these data. However, the present invention is not limited to these data formats.

In one embodiment of the present invention, the network 80 can be a wired or a wireless network. The network described above can be Internet, General Packet Radio Service (GPRS), Third Generation (3G), Wireless Fidelity (Wi-Fi) or Worldwide Interoperability for Microwave Access (WiMAX). However, the present invention is not limited to these networks.

In one embodiment of the present invention, the multimedia data streaming system 1 can be software; hardware; firm ware or a combination of these elements. The multimedia data streaming system 1 can be installed into devices such as a computer; a mobile phone; a PDA; a game console or a set-top box. However, the present invention is not limited to these devices. The multimedia data streaming system 1 can be installed into devices which have the ability of connecting to a network as well as the ability of providing streaming pieces. In one embodiment, the receiver 91 can be software; hardware; firm ware or a combination of these elements. Similarly, the receiver 91 can also be installed in devices such as a computer; a mobile phone; a PDA; a game console or a set-top box. However, the present invention is not limited to these devices. The receiver 91 can be installed into devices which have the ability of connecting to a network and also the ability of receiving the streaming pieces.

FIG. 2 shows the functional diagram of the multimedia data streaming system of the present invention.

As shown in FIG. 2, different bit rates of multimedia data is transmitted by the multimedia data streaming system 1 to the receiver 91 by the streaming server 60. The multimedia data streaming system 1 comprises a converting module 30 and a scheduler module 40. The multimedia data streaming system 1 and the streaming server 60 are connected through the network 80, and the streaming server 60 and the receiver 91 are connected through a network. The streaming server 60 is able to accept a multimedia data streaming request from the receiver 91. The sources of the original multimedia data can be from external devices (not shown) or from a database 20. However, the present invention is not limited to these sources. Take note that in one embodiment, the multimedia data streaming system 1 can also comprise the streaming server 60. The streaming server 60 is a known technology of the art, so it will not be discussed in further detail.

The converting module 30 can convert the original multimedia data into streaming pieces of different bit rates. The scheduler module 40 can obtain the bandwidth condition between the streaming server 60 and the receiver 91 dynamically. The scheduler module 40 can then request the converting module 30 to convert the original data into streaming pieces with the optimal bit rates according to the bandwidth condition detected. The streaming pieces can then be transmitted to the receiver 91 by the streaming server 60. Therefore, according to the bandwidth condition detected dynamically, the multimedia data streaming system 1 can transmit streaming pieces with optimal bit rates to the receiver 91.

In one embodiment of the present invention, the multimedia data streaming system 1 comprises the database 20 used for storing streaming pieces generated by the converting module 30. According to the bandwidth obtained, the scheduler module 40 will request the database 20 for a streaming piece which has a bit rate substantially close to the bandwidth detected. If such streaming piece exists, the streaming piece will be transmitted to the streaming server 60, then to the network 80 and then to the receiver 91. If no such streaming piece exists, the converting module 30 will convert the original data into a streaming piece which has a bit rate substantially close to the bandwidth. The streaming piece will be stored in the database 20 temporarily, and then it will be transmitted to the streaming server 60 which passes through the network 80 and arrives at the receiver 91.

In one embodiment of the present invention, the scheduler module 40 further comprises a detecting module 41 and a forecasting module 42. The detecting module 41 is employed to obtain the bandwidth condition between the streaming server 60 and the receiver 91 dynamically. In one embodiment, the detecting module 41 can detect in real-time or in a fixed time interval in order to obtain the bandwidth condition between the streaming server 60 and the receiver 91. The forecasting module 42 is employed to forecast the bandwidth condition between the streaming server 60 and the receiver 91. For example, the detecting module 41 will ping the receiver 91 at a fixed time interval by the streaming server 60. The receiver 91 will then return a packet which passes through the streaming server 60 and to the detecting module 41. The response time of this process can be used to estimate the bandwidth condition between the streaming server 60 and the receiver 91. The forecasting module 42 can use the bandwidth condition in a statistical analysis to predict the forthcoming bandwidth condition. After the bandwidth has been predicted, the scheduler module 40 can request the converting module 30 to pre-convert the streaming pieces with a bit rate substantially close to the predicted bandwidth. Thus, the transmission process will become more efficient. However, the present invention is not limited to the above mentioned detecting or forecasting method.

In one embodiment of the present invention, the converting module 30 further comprises a multiple of devices 31. Each device consists of a system resource (for example, operation ability, transmission ability or memory space) and a work status. By the converting module 30, one is able to perform optimal resource allocation according to the system resource and the work status of each device 31. Thus, the data which requires more resources can be processed more efficiently. For example, in one embodiment, the converting module 30 converts the original data into a group of pictures (GOP) and allocates them to each device 31. Each device 31 then individually performs the required operation and conversion process. The data processed by the devices 31 is combined to form the streaming piece. Next, the streaming piece can be stored into the database 20, pass through the streaming server 60 and arrive at the receiver 91.

Take note that when transmitting streaming pieces with different bit rates, there will be no confusion at the receiver 91 regarding the sequence of the streaming pieces. Through RTP or RTSP protocol, the streaming server 60 will place a sequence number or a time stamp on each streaming piece before transmitting it to the receiver 91. Thus, when streaming pieces are transmitted with different bit rates, the streaming server 60 only needs to send the next sequence number or time stamp to the receiver 91. As a result, it is not necessary to retransmit all the streaming pieces.

In one embodiment, the multiple of devices 31 include computers, mobile phones, PDAs, game consoles or set-top boxes. However, the present invention is not limited to these devices. Any device which has the ability to perform operation and conversion can be used as a device 31 for the present invention.

The multimedia data streaming system 1 will obtain the bandwidth condition between the multimedia data streaming system 1 and the receiver 91 at a predetermined time interval and will dynamically transmit at least one streaming piece with a suitable bit rate to the receiver 91. As a result, the transmission quality will not be affected by the bandwidth deficiency or bandwidth instability, and the receiver 91 will be able to receive every streaming piece successfully.

For example, when the receiver 91 (e.g, a mobile phone) requests a 3GP file from the streaming server 60 via the network 80 (e.g. 3G network), the scheduler module 40 will employ the detecting module 41 to detect the bandwidth condition between the streaming server 60 and the receiver 91. If 200 kbits/sec is detected, the scheduler module 40 will inquire the database 20 to find out if there is a 200 kbits/sec streaming piece for the 3GP file. If the database 20 includes the required streaming piece, the 200 kbits/sec streaming piece of the 3GP file will be transmitted to the receiver 91. If the database 20 does not include the required streaming piece, the scheduler module 40 will request the conversion module 30 to convert the 3GP file into streaming pieces of 200 kbits/sec, and the streaming pieces will be transmitted to the receiver 91 and get stored in the database 20. During transmission of the 200 kbits/sec streaming piece, the detecting module 41 will re-detect the bandwidth condition between the streaming server 60 and the receiver 91 every single second. If the bandwidth detected has been reduced to 100 kbits/sec, the above mentioned process will be repeated. The scheduler module 40 will request a streaming piece of 100 kbits/sec from the database 20, or it will request the converting module 30 to convert the 3GP file into streaming pieces of 100 kbits/sec and then transmit it to the receiver 91. Take note that when the streaming pieces are transmitted with different bit rates, RTP or RTSP protocol is used, and there will be no confusion at the receiver 91 regarding to the sequence of the streaming pieces. Therefore, the scheduler module 40 can dynamically request the converting module 30 to generate different bit rates of multimedia data in accordance with the bandwidth detected. Thus, an optimal streaming quality can be obtained under variable network bandwidths.

As another example, when the receiver 91 (e.g, a computer) requests a real time video (e.g, a baseball game) from the streaming server 60 via the network 80, the scheduler module 40 will employ the detecting module 41 in order to detect the bandwidth condition between the streaming server 60 and the receiver 91. If 300 kbits/sec is detected, the scheduler module 40 will request the converting module 30 to convert the real time video into 300 kbits/sec streaming pieces, and the streaming pieces will be transmitted to the receiver 91 and will be stored in the database 20. During transmission of the 300 kbits/sec streaming piece, the detecting module 41 will re-detect the bandwidth condition between the streaming server 60 and the receiver 91 every 0.5 second. If the bandwidth detected is reduced to 50 kbits/sec, the above mentioned process will be repeated. However, the scheduler module 40 will request the converting module 30 to convert the real time video into 50 kbits/sec streaming pieces, and the streaming pieces will be transmitted to the receiver 91 and will be stored in the database 20. Take note that when transmitting streaming pieces with different bit rates, RTP or RTSP protocol is used, there will be no confusion at the receiver 91 regarding to the sequence of the streaming pieces, and there is no need for the retransmission of streaming pieces when altering the transmission bit rate. As a result, the scheduler module 40 can dynamically request the converting module 30 to generate different bit rates of multimedia data in accordance with the bandwidth detected at the receiver 91. Thus, optimal streaming quality can be obtained under the condition of variable network bandwidths.

Figure 3:
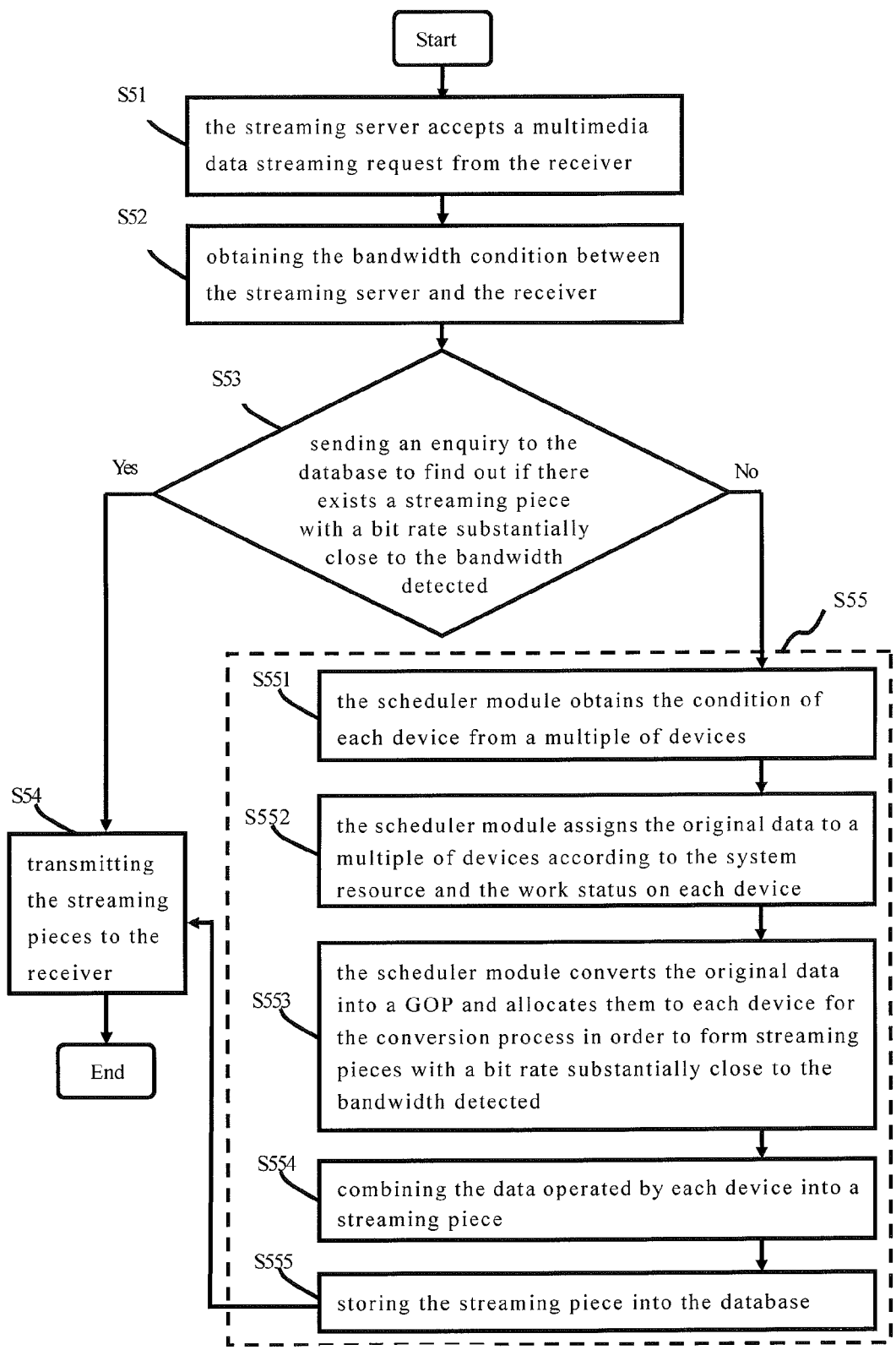
FIG. 3 shows a flow chart of the multimedia data streaming method.

The present invention also provides a multimedia data streaming method. The multimedia data can be dynamically streamed to the receiver by passing through the network and the streaming server. FIG. 3 shows a flow chart of the multimedia data streaming method.

As shown in FIG. 3, the present invention first proceeds with step S51: the streaming server accepts a multimedia data streaming request from the receiver.

In one embodiment, the streaming server accepts a multimedia data streaming request from the receiver, and the request is then passed onto the scheduler module.

Next, the present invention proceeds with step S52: obtaining the bandwidth condition between the streaming server and the receiver dynamically.

In one embodiment, the bandwidth condition of the network is obtained from the receiver dynamically at a fixed time interval (e.g. 1 second). The bandwidth condition of the network between the receiver and the streaming server is obtained by detection. The condition obtained can be used to forecast the bandwidth condition between the receiver and the streaming server.

Next, the present invention proceeds with step S53: sending an enquiry to the database to find out if there exists a streaming piece with a bit rate substantially close to the bandwidth detected.

Next the present invention proceeds with step S54: if the requested streaming piece exists, the streaming pieces will be transmitted to the receiver. Alternatively, it will proceed with step S55: if there are no such streaming pieces, the original multimedia data will be converted into streaming pieces with a bit rate substantially close to the bandwidth condition, and the streaming pieces will be transmitted to the receiver and will then be stored in the database.

In one embodiment, the step S55 further comprises the following steps:

Step S551: the scheduler module obtains the condition of each device of a multiple of devices. The condition of each device includes a system resource and a work status.

Step S552: the scheduler module assigns the original data to the multiple of devices according to the system resource and the work status on each device.

Step S553: the scheduler module converts the original data into a group of pictures (GOP) and allocates them to each device for the conversion process in order to form streaming pieces with a bit rate substantially close to the bandwidth detected.

Step S554: combining the data operated by each device into a streaming piece.

Step S555: storing the streaming piece into the database. When step S55 is completed, the present invention proceeds with the step S54: transmitting the streaming piece to the receiver.

Take note that if the multimedia data is not completely transmitted (the completion of the transmission process is determined by the streaming server), the procedures of the multimedia data streaming system method will be repeated. Through the above processes, the original data can be converted into streaming pieces with the optimal bit rates in accordance with the bandwidth condition detected. The streaming pieces can be transmitted to the receiver by the streaming server.

In one embodiment of the present invention, the multiple of devices can be a computer; a mobile phone; a PDA; a game console and a set-top box. However, the present invention is not limited to these devices. Devices that can perform operation and conversion can be one of these devices. Also, the receiver can be a computer; a mobile phone; a PDA; a game console or a set-top box. However, the receiver is not limited to these devices. In the present invention, devices which have the function of receiving streaming pieces can be used as a receiver.

Although the present invention has been explained in relation to its preferred embodiments, it is also of vital importance to acknowledge that many other possible modifications and variations can be made without departing from the spirit and scope of the invention as hereinafter claimed.

What is claimed is:

1. A multimedia data streaming method able to transmit multimedia data through a dynamic streaming process comprising:
    obtaining a first bandwidth condition at a receiver dynamically by a scheduler module;
    obtaining a first streaming piece having a bit rate substantially close to the first bandwidth condition detected;
    placing a first sequence number or a first time stamp on the first streaming pieces;
    transmitting the first streaming piece with the first sequence number or the first time stamp to the receiver;

obtaining a second bandwidth condition at the receiver dynamically by the scheduler module, with the second bandwidth condition being different than the first bandwidth condition;

obtaining a second streaming piece having a bit rate substantially close to the second bandwidth condition detected; and placing a second sequence number or a second time stamp on the second streaming piece; transmitting the second stream piece with the second sequence number or the second time stamp to the receiver;

wherein the first and second streaming pieces of different bit rates are generated dynamically in accordance with the first and second bandwidth conditions detected and the first and second streaming pieces are transmitted to the receiver, wherein obtaining a first streaming piece further comprises:

requesting a database for the first streaming piece;

if the first streaming piece exists in the database, transmitting the first streaming piece to a streaming server;

if the first streaming piece does not exist in the database, converting original data of the multimedia data into streaming pieces with a bit rate substantially close to the first bandwidth condition detected and which are stored in the database and transmitted to the receiver, wherein converting the original data of the multimedia data comprises:

converting the original data of the multimedia data into a group of pictures;

obtaining a condition of each device from a multiple of devices, wherein the condition of each device includes a system resource and a work status;

allocating the group of pictures to each device according to the system resource and the work status of each device; and combining the data operated by each device into a streaming piece.

2. The multimedia data streaming method as claimed in claim 1, wherein obtaining the first bandwidth condition at the receiver comprises obtaining the first bandwidth condition in a real-time manner or at a fixed time interval.

3. The multimedia data streaming method as claimed in claim 1, wherein the first bandwidth condition at the receiver is obtained dynamically through a detection method or a forecasting method.

4. The multimedia data streaming method as claimed in claim 1, wherein the multimedia data is in the form of video data, sound data, image data or text data.

5. The multimedia data streaming method as claimed in claim 1, wherein the multiple of devices comprises a computer; a mobile phone; a PDA; a game console; or a set-top box.

6. The multimedia data streaming method as claimed in claim 1, wherein the receiver is a computer; a mobile phone; a PDA; a game console or a set-top box.

7. A multimedia data streaming system able to transmit multimedia data from a streaming server to a receiver through a dynamic streaming process comprising:

a converting module configured as a hardware device, firmware, an electric circuit or a combination thereof with the converting module converting original data of the multimedia data into streaming pieces with different bit rates;

a scheduler module configured as a hardware device, firmware, an electric circuit or a combination thereof, with the scheduler module obtaining a bandwidth condition between the streaming server and the receiver dynamically, with the scheduler module requesting the converting module to convert the original data of the multimedia data into the streaming pieces with optimal bit rates in accordance with the bandwidth condition detected, with the streaming server transmitting streaming pieces to the receiver;

a database storing the streaming pieces converted by the converting module; wherein the scheduler module requests the database for a first streaming piece having a bit rate substantially close to the bandwidth detected;

if the first streaming piece exists in the database, the first streaming piece is transmitted to the streaming server;

if the first streaming piece does not exist in the database, the original data of the multimedia data is converted into the streaming pieces with a bit rate which is substantially close to the bandwidth condition, stored in the database and transmitted to the receiver;

placing a sequence number or a time stamp on each of the streaming pieces before transmitting each of the streaming pieces to the receiver;

wherein the streaming pieces of different bit rates are generated dynamically in accordance with the bandwidth condition detected and the streaming pieces are transmitted to the receiver, wherein the converting module comprises a multiple of devices, wherein the converting module converts the original data of the multimedia data into a group of pictures and allocates the group of pictures to the multiple of devices, with each device performing the conversion process individually wherein the streaming server sends a next sequence number or time stamp if the streaming pieces are of different bit rates;

wherein the converting module allocates the pictures in accordance with a system resource and a work status of each device and combine the data operated by each device into a streaming piece.

8. The multimedia data streaming system as claimed in claim 7, wherein the scheduler module obtains the bandwidth condition of the receiver in a real-time manner or at a fixed time interval.

9. The multimedia data streaming system as claimed in claim 7, wherein the scheduler module comprises a detecting module detecting the bandwidth condition between the streaming server and the receiver dynamically.

10. The multimedia data streaming system as claimed in claim 7, wherein the scheduler module comprises a forecasting module forecasting the bandwidth condition between the streaming server and the receiver dynamically.

11. The multimedia data streaming system as claimed in claim 7, wherein the multimedia data is in the form of video data, sound data, image data or text data.

12. The multimedia data streaming system as claimed in claim 7, wherein the multiple of devices comprises a computer; a mobile phone; a PDA; a game console or a set-top box.

13. The multimedia data streaming system as claimed in claim 7, wherein the receiver is a computer; a mobile phone; a PDA; a game console or a set-top box.

* * * * *